Figure 1:
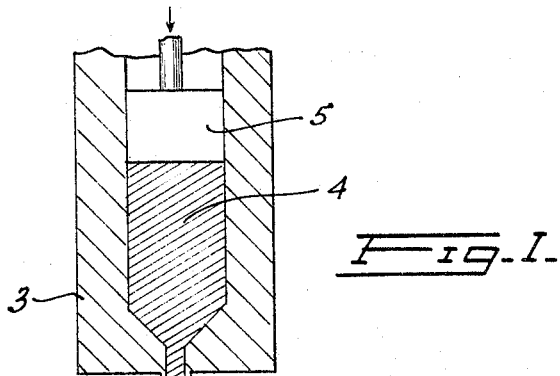

Sept. 6, 1966  R. D. WATSON  3,270,413
PROCESS FOR PRODUCING A DIFFUSIONLESS BOND BETWEEN METALS
Filed Dec. 2, 1963  2 Sheets-Sheet 1

INVENTOR
ROBERT D. WATSON
By *[signature]*
PATENT AGENT

Sept. 6, 1966 R. D. WATSON 3,270,413
PROCESS FOR PRODUCING A DIFFUSIONLESS BOND BETWEEN METALS
Filed Dec. 2, 1963 2 Sheets-Sheet 2

INVENTOR
ROBERT D. WATSON
By
PATENT AGENT

United States Patent Office 3,270,413
Patented Sept. 6, 1966

3,270,413
PROCESS FOR PRODUCING A DIFFUSIONLESS
BOND BETWEEN METALS
Robert D. Watson, Deep River, Ontario, Canada, assignor to Atomic Energy of Canada Limited, Ottawa, Ontario, Canada, a corporation
Filed Dec. 2, 1963, Ser. No. 327,311
3 Claims. (Cl. 29—527)

This invention relates to a method and apparatus for bonding metallic members and more particularly to a method for producing a diffusionless bond between dissimilar metals such as zirconium and aluminum, zirconium alloys and aluminum, stainless steel and aluminum, and uranium and aluminum.

According to present knowledge, dissilimar metals may be joined together by a rolled type of joint. In addition, some metals can be joined together by diffusion bonding. Both methods have drawbacks. When dissimilar metals are used in rolled joints it is difficult to produce a joint that remains leak-tight after thermal cycling because of the different coefficients of expansion of the two metals. With diffusion bonding, the surfaces generally must be kept absolutely free of oxide so that diffusion can take place, otherwise no bond at all can be obtained. Achieving an oxide free surface is difficult in practice.

In addition to the above two methods of joining metals, brazing techniques have also been used. Brazing requires the use of an active flux which cannot be removed easily and may cause corrosion.

In nuclear reactor technology, the use of certain metals such as stainless steel, zirconium, zirconium alloys such as Zircaloy-2 and uranium have been found to be most advantageous because of their mechanical, thermal, and nuclear properties. Although these metals have the necessary properties for fabricating nuclear reactor components, they have the disadvantage, because of their metallurgical properties, of being difficult to work with especially in the making of joints either between one component of one metal and another component of a dissimilar metal or between two components of the same metal.

Any joints or bonds built into a nuclear recator must meet very stringent specifications. They must be completely leak-proof and must be capable of withstanding thermal recycling almost indefinitely.

It is an object of the present invention to provide a simple and reliable method and apparatus for bonding dissimilar metals such as stainless steel and aluminum, zirconium and aluminum, Zircaloy and aluminum, zirconium alloys, and uranium and aluminum.

It is another object of the present invention to provide a method of forming joints between components made of metals of the group stainless steel, zirconium, zirconium alloys, and uranium, either with components made of the same metal or of a different metal in the group.

It is another object of the invention to provide a method of forming joints in components made of the metals mentioned above that can be readily completed in the field without the requirement for complex or bulky equipment.

These and other objects of the invention are achieved by forming a thin oxide layer on the surface of the metal tube that is to be fabricated, extruding an encircling layer of aluminum on the surface of the tube, and cutting away a portion of the end of the tube such that an extending collar of aluminum is left. A tube that is otherwise difficult to fabricate having such a collar can be readily joined in the field by welding the aluminum to other aluminum tubes or to the metal tubes made in a similar fashion with an extending aluminum collar.

Figure 2:
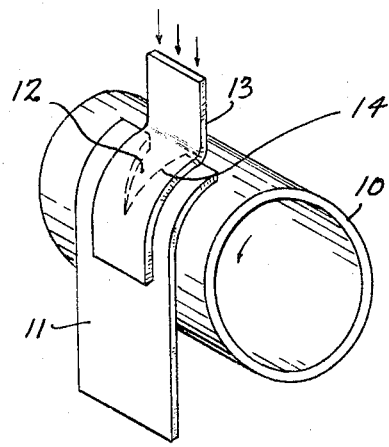
Figure 3:
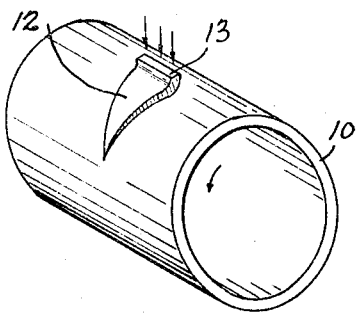
Figure 4:
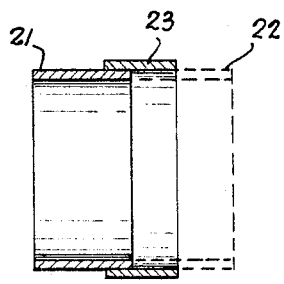
Figure 5:
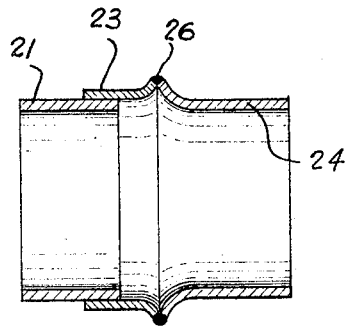

In drawings which illustrate apparatus for achieving the bonds according to the invention, FIGURE 1 is a cross-section view of extrusion and mandrel apparatus for extruding a well-bonded layer of aluminum onto a metal tube, FIGURES 2 and 3 show a preferred means of starting the extruded layer of aluminum, FIGURES 4 and 5 show a method of forming a transition section on the end of a pipe that can be readily welded in the field.

Referring to FIGURE 1, a metal tube 1 is positioned on an expanding mandrel 2. The mandrel is carried by a central shaft 8 which would be suitably mounted in bearings in a frame and with drive means (not shown) connected to the shaft to rotate the mandrel assembly. The mandrel assembly is positioned under the orifice 6 of an extrusion die 3. A billet of aluminum 4 is compressed and extruded from die 3 by means of a ram 5. The extrusion apparatus and its operation are conventional in nature and are, therefore, shown in schematic form only.

The metal tube 1 which might be zirconium, zirconium alloy, stainless steel, uranium, or other metal that is difficult to join by standard welding or brazing techniques is pre-treated by first cleaning and then heating in air to form a thin oxide layer on the metal. The tube is placed on the expanding mandrel which is positioned under the orifice 6 of die 3. The orifice 6 (shown in cross-section in FIGURE 1) is preferably rectangular in exit cross-section. In actual practice best results were achieved when the axes of the tube and the long dimension of the die intersected at right angles.

In operation, a billet of aluminum is loaded in the die. The die equipment is heated to about 500° C. The tube specimen is mounted on the mandrel and heated in an electric furnace to a temperature in the range 400° C. to 600° C. The tube on its mandrel is then placed below the orifice of the die with the axis of the tube at right angles to the long dimension of the orifice. Ram pressure is applied to the aluminum and the mandrel and tube are rotated slowly (approximately 1.5 r.p.m.) as soon as the aluminum appears at the exit of the die orifice. A strip of aluminum is extruded onto the tube and forms a layer thereon. The tube is rotated until the aluminum build-up on the tube is of the desired thickness.

It has been found that the aluminum forms an adequate bond with the metal tube using this procedure. A thin oxide layer that forms on the surface of the metal tube helps to prevent diffusion and at the same time produces exceptionally strong bonds with aluminum. This thin oxide layer forms naturally on most metals, e.g. uranium, zirconium, zirconium alloys, steel, and certain others. The formation of this layer may, if desired, be accelerated (or the metals in question) by heating in air or by anodizing in an aqueous solution of sodium hydroxide. More detailed information on the function of an oxide bond on uranium prior to cladding with aluminum is given in my Canadian Patent No. 670,910 which issued on September 24, 1963.

A difficulty that was encountered in using the extrusion method described above was the poor quality of the bond of the aluminum to the tube at and near the first area of contact. This difficulty was overcome by using a piece of steel shim stock 11 having a triangular notch 14 (shown dotted in FIGURE 2). This shim stock is placed between the tube and the die orifice prior to extrusion. When extrusion begins, the aluminum adheres to the shim stock which is moved transversely at approximately the same speed as the periphery of the tube. When the notch 14 passes under the die the aluminum begins to adhere to the exposed metal of tube 10. When the shim stock has passed completely beyond the mouth of the die it is removed by lifting it from the end opposite the notch. This leaves a triangular leading edge 12 to the aluminum (see FIGURE 3). When the tube rotates until the leading edge 12 passes under the die, the extruded layer of aluminum 13 readily envelops this leading edge and forms a smooth overlap with no break in the bond to the metal tube.

After the drive shaft has been allowed to rotate until the desired thickness of aluminum has been applied to the tube (e.g. about 4 revolutions for a ⅛ in. thick coating), the rotation is stopped and the ram pressure is removed. The mandrel and tube are lowered and the ram pressure is reapplied until the tube has been lowered at least ¼ in. from the die orifice. The connecting link between the tube such that a pile-up of aluminum was formed adchisel. The tube and the encircling layer of aluminum are allowed to cool.

In carrying out the above operation, applicant found that the bond between the aluminum and the oxidized metal surface of the rotating metal tube was not always as good as required. This poor bond was believed to be caused by an oxide layer forming on the surface of the aluminum in the time it left the orifice of the extrusion die and was deposited on the pipe. This problem was overcome by adjusting the die orifice in relation to the metal tube such that a pile-up of aluminum was formed adjacent the orifice upstream or ahead of the orifice in relation to the moving surface of the pipe. This pile-up of aluminum (shown at 9 in FIGURE 1) in effect forms a stagnant pool or layer and isolates the moving layer of aluminum being extruded from the atmosphere and the oxidizing effects of the air.

FIGURES 4 and 5 show a method of preparing the tube for easy joining in the field. The metal tube 21 on which a layer of aluminum 23 has been deposited has its end portion 22 (shown dotted) cut away. This leaves the tube with a projecting collar of aluminum. This collar or ring can be readily welded in the field to an aluminum pipe 24 or to another metal tube prepared as above with an aluminum transistion section. Applicant has found by repeated tests that a joint made in this fashion will rupture first along the weld line 26. This shows that the bond achieved between metal pipe 21 and the layer of aluminum is as good as or better than that obtained at the weld line.

What is claimed is:
1. A method of forming a leak-proof bond between aluminum and one of the metals of the group zirconium, zirconium alloys, uranium, and stainless steel comprising:
  (a) forming a thin oxide layer on the surface of a tube of the metal to be bonded,
  (b) heating the said tube to a temperature in the range 400° C. to 600° C.,
  (c) rotating the tube on a mandrel slowly under the orifice of an extrusion die, and
  (d) extruding an encircling built-up layer of aluminum onto the oxidized surface of the tube, said aluminum having been heated in the die prior to extrusion to a temperature of approximately 500° C.

2. A method of preparing tubes made of the metals of the group zirconium, zirconium alloys, uranium, and stainless steel for subsequent fabrication in the field comprising:
  (a) forming a thin oxide layer on the surface of a tube of the metal to be employed,
  (b) pre-heating the said tube to a temperature in the range 400° C. to 600° C.,
  (c) extruding an encircling, built-up layer of aluminum onto the surface of the tube adjacent one end thereof, said aluminum having been heated prior to extrusion to a temperature of approximately 500° C., and
  (d) cutting away a portion of the tube to leave an extending collar of aluminum, said collar being such that subsequent joining of the aluminum collar to another aluminum tube is readily achieved.

3. A method as in claim 1 wherein the aluminum is extruded from the die at such an angle as to form a stagnant pool of aluminum at the orifice of the die, said stagnant pool of aluminum isolating subsequent aluminum issuing from the die from the oxidizing effects of the atmosphere.

References Cited by the Examiner
UNITED STATES PATENTS

| | | |
|---|---|---|
| 3,007,219 | 11/1961 | Jepson. |
| 3,054,694 | 9/1962 | Aues _____ 117—71 X |
| 3,167,858 | 2/1965 | Knapp _____ 29—487 |

FOREIGN PATENTS 858,301  1/1961  Great Britain.

JOHN F. CAMPBELL, *Primary Examiner.*

P. M. COHEN, *Assistant Examiner.*